(12) United States Patent
Meth et al.

(10) Patent No.: US 6,332,200 B1
(45) Date of Patent: Dec. 18, 2001

(54) CAPTURING AND IDENTIFYING A COMPLETE AND CONSISTENT SET OF CHECKPOINT FILES

(75) Inventors: Kalman Zvi Meth, Netanya; Adnan M. Agbaria, Musmus, both of (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/182,175

(22) Filed: Oct. 29, 1998

(51) Int. Cl.$^7$ .............................. G06F 11/00; G06F 11/36
(52) U.S. Cl. .............................. 714/16; 714/15; 707/203; 712/228
(58) Field of Search .................................. 714/13, 15, 16, 714/25, 30, 34, 35, 38, 41, 47, 48; 711/141, 147; 712/228; 700/5; 707/203

(56) References Cited

U.S. PATENT DOCUMENTS

| | | | |
|---|---|---|---|
| 4,703,481 | 10/1987 | Fremont | 371/12 |
| 4,823,261 | 4/1989 | Bank et al. | 364/200 |
| 5,008,786 | 4/1991 | Thatte | 364/200 |
| 5,301,309 | 4/1994 | Sugano | 395/575 |
| 5,455,929 | 10/1995 | Bosshart et al. | 395/500 |
| 5,495,590 | 2/1996 | Comfort et al. | 395/375 |
| 5,551,043 | 8/1996 | Crump et al. | 395/750 |
| 5,590,277 | 12/1996 | Fuchs et al. | 395/183.14 |
| 5,621,885 * | 4/1997 | Del Vigna, Jr. | |
| 5,630,047 | 5/1997 | Wang | 395/182.13 |
| 5,634,096 | 5/1997 | Baylor et al. | 395/182.04 |
| 5,644,742 | 7/1997 | Shen et al. | 395/591 |
| 5,659,721 | 8/1997 | Shen et al. | 395/569 |
| 5,710,929 | 1/1998 | Fung | 395/750 |

FOREIGN PATENT DOCUMENTS

| | | |
|---|---|---|
| 58-002936 | 1/1983 | (JP) . |
| 5-119995 | 5/1993 | (JP) . |
| 6-052031 | 2/1994 | (JP) . |
| 7-013805 | 1/1995 | (JP) . |
| 8-069404 | 3/1996 | (JP) . |
| 9309859 | 10/1993 | (KR) . |

OTHER PUBLICATIONS

Elephant: the file system that never forgets—Santry, D.J.; Feeley, M. J.; Hutchinson, N. C.; Veitch, A. C., Dept. of comput. sci., British Columbia Univ.,Vancouver, BC, Canada. This paper apears in: Hot Topics in Operating systems, 1999. Abstract is provided.*

Checkpoint and Migration of UNIX Processes in the Condor Distributed Processing System, Todd Tannenbaum, Michael Litskow, Dr. Dobbs Journal, 227:40–48, Feb. 1995.

Supporting Checkpointing and Process Migration Outside the UNIX Kernel, M. Litskow, M. Solomon, Proceedings of Usenix Winter 1992 Conference, Jan. 1992.

LIBCKPT: Transparent Checkpointing Under UNIX, James S. Plank, Micah Beck, Gerry Kingsley, Kai Li, Usenix Winter 1995 Technical Conference, Jan. 1995.

(List continued on next page.)

*Primary Examiner*—Gopal C. Ray
(74) *Attorney, Agent, or Firm*—Floyd A. Gonzalez, Esq.; Blanche E. Schiller, Esq.; Heslin Rothenberg Farley & Mesiti P.C.

(57) ABSTRACT

A complete and consistent set of checkpoint files is captured and identified for use in restarting a parallel program. When each process of a parallel program takes a checkpoint, it creates a checkpoint file. The checkpoint file is named, and a part of that name includes a version number for the checkpoint file. When a parallel program is to be restarted, each process of the parallel program identifies its most current valid checkpoint file. It provides the version number of this file to a coordinating process. The coordinating process then decides which version of the checkpoint files is valid and complete for all of the processes of the parallel program participating in restart. Once this version number is determined, it is forwarded to the processes and the processes restore themselves using its corresponding checkpoint file having that particular version number.

42 Claims, 10 Drawing Sheets

OTHER PUBLICATIONS

An Overview of Checkpointing in Uniprocessor and Distributed Systems, Focusing on Inplementation and Performance, James S. Plank, Technical Report UT–CS–97–372, University of Tennessee, Jul. 1997.

Efficient Checkpointing on Mimd Architectures, James Steven Plank, PhD Dissertation, Princeton University, Jun. 1993.

Checkpointing Distributed Shared Memory, Luis M. Silva, Joao Gabriel Silva, The Journal of Supercomputing, 11:137–158 (1997).

A Checkpointing Strategy for Scalable Recovery on Distributed Parallel Systems, Vijay K. Naik, Samuel P. Midkiff, Jose E. Moreira, IBM Research Report, Jun. 23, 1997.

* cited by examiner

TYPICAL CHECKPOINT FILE LIFE CYCLE

| CHECKPOINT FILES FOR PROCESS 1 | CHECKPOINT FILES FOR PROCESS 2 | |
|---|---|---|
| 502↘ 504↘ 500↗ CHKPT.1.1 ↙506 | | (NO CHECKPOINT FILES) ↙510 |
| CHKPT.1.1 | CHKPT.2.1 | (AFTER FIRST CHECKPOINT) ↙512 |
| CHKPT.1.2 | CHKPT.2.1 | (AFTER SECOND CHECKPOINT, BEFORE COMMIT) ↙514 |
| CHKPT.1.2 | CHKPT.2.2 | (AFTER SECOND CHECKPOINT, AFTER COMMIT) ↙516 |
| CHKPT.1.2 | CHKPT.2.2 | (AFTER THIRD CHECKPOINT, BEFORE COMMIT) ↙518 |
| CHKPT.1.3 | CHKPT.2.3 | |
| CHKPT.1.3 | CHKPT.2.3 | (AFTER THIRD CHECKPOINT, AFTER COMMIT) ↙520 | fig. 5

| CHECKPOINT FILES FOR PROCESS 1 | CHECKPOINT FILES FOR PROCESS 2 | |
|---|---|---|
| ... | | |
| CHKPT.1.1 | CHKPT.2.1 | (AFTER FIRST CHECKPOINT) |
| CHKPT.1.1 | CHKPT.2.1 | (AFTER SECOND CHECKPOINT, WHERE PROCESS 1 WRITES ONLY A PARTIAL SECOND CHECKPOINT) |
| CHKPT.1.2 XXX | CHKPT.2.2 | |

PARTIAL CHECKPOINT FILE IN SOME PROCESS

*fig. 8*

CAPTURING AND IDENTIFYING A COMPLETE AND CONSISTENT SET OF CHECKPOINT FILES

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"A METHOD OF PERFORMING CHECKPOINT/ RESTART OF A PARALLEL PROGRAM," by Meth, et al., Ser. No. 09/181,985;

"A SYSTEM OF PERFORMING CHECKPOINT/ RESTART OF A PARALLEL PROGRAM," by Meth et al., Ser. No. 09/181,981;

"PROGRAM PRODUCTS FOR PERFORMING CHECKPOINT/RESTART OF A PARALLEL PROGRAM," by Meth et al., Ser. No. 09/182,555;

"RESTORING CHECKPOINTED PROCESSES INCLUDING ADJUSTING ENVIRONMENT VARIABLES OF THE PROCESSES," by Meth et al., Ser. No. 09/182,357; and "RESTORING CHECKPOINTED PROCESSES WITHOUT RESTORING ATTRIBUTES OF EXTERNAL DATA REFERENCED BY THE PROCESSES," by Meth et al., Ser. No. 09/182,725.

TECHNICAL FIELD

This invention relates, in general, to taking a checkpoint of a parallel program and, in particular, to capturing and identifying a complete and consistent set of checkpoint files for the parallel program.

BACKGROUND ART

A requirement of any robust computing environment is to be able to recover from errors, such as device hardware errors (e.g., mechanical or electrical errors) or recording media errors. In order to recover from some device or media errors, it is necessary to restart a program, either from the beginning or from some other point within the program.

To facilitate recovery of a program, especially a long running program, intermediate results of the program are taken at particular intervals. This is referred to as checkpointing the program. Checkpointing enables the program to be restarted from the last checkpoint, rather than from the beginning of the program.

When checkpointing a program, it is important to generate a complete new checkpoint file before destroying any old checkpoint file. This is to ensure that at any instant there is a valid checkpoint file from which the program can be restored. If an old checkpoint file is erased before the new checkpoint file is completed (or if the old checkpoint file is directly overwritten with the new checkpoint file), it is possible that a system failure will occur at precisely the moment when the old checkpoint file no longer exists, but the new checkpoint file is not yet valid. This causes a situation in which there is no valid checkpoint file.

When checkpointing a parallel program, there is an additional complication. The state of all the processes of the parallel program are to be saved in a consistent manner. Thus, in general, it is not sufficient to simply take a checkpoint of each of the processes individually. Instead, the processes are coordinated, so that the resulting checkpoints reflect a valid state of the parallel program, when taken as a whole.

A problem arises if any one of the processes has an inconsistent checkpoint file as compared to the others. For example, assume a parallel program has a plurality of processes and all but one of those processes completed taking a new checkpoint. If one of the processes that finished taking a checkpoint erases its old checkpoint file, then upon restart there is no complete set of consistent checkpoint files. This is because the one process no longer has an old checkpoint file, and the process that failed does not have a new checkpoint file.

Based on the foregoing, a need exists for a capability that ensures the capture of a complete and consistent set of checkpoint files for a parallel program. A further need exists for a capability that identifies a complete and consistent set of checkpoint files for a parallel program.

SUMMARY OF THE INVENTION

The shortcomings of the prior art are overcome and additional advantages are provided through the provision of a method of identifying a complete and consistent set of checkpoint files for a parallel program. The method includes, for instance, determining, by a plurality of processes of the parallel program, a plurality of version numbers representative of a plurality of current valid checkpoint files corresponding to the plurality of processes. The method further includes selecting from the plurality of version numbers a selected version number representative of a consistent set of checkpoint files for the parallel program.

In one embodiment, the consistent set of checkpoint files includes a plurality of checkpoint files corresponding to the plurality of processes and having the selected version number.

In a further embodiment, the method includes restoring the plurality of processes using the plurality of checkpoint files having the selected version number. In one example, prior to restoring, the plurality of processes verify that they have the plurality of checkpoint files with the selected version number.

In one embodiment, each of the plurality of current valid checkpoint files has a corresponding name, and each name includes one of the plurality of version numbers.

In a further example, the determining of the plurality of version numbers includes, for each process of the plurality of processes, identifying one or more valid checkpoint files corresponding to each process, in which each of the one or more valid checkpoint files has a corresponding name with a version number; and selecting from the one or more valid checkpoint files a maximum version number. Thus, the plurality of version numbers includes a plurality of maximum version numbers.

Further, the selected version number is a minimum version number selected from the plurality of maximum version numbers.

In another aspect of the present invention, a method of identifying a set of complete and consistent checkpoint files for a parallel program is provided. The method includes, for instance, selecting, by a plurality of processes of the parallel program, a plurality of current valid checkpoint files corresponding to the plurality of processes. The method further includes using the selected plurality of current valid checkpoint files to identify a consistent set of checkpoint files for the parallel program.

In another aspect of the present invention, a method of capturing a set of checkpoint files for a parallel program is provided. The method includes, for instance, providing a plurality of checkpoint files to be used during a taking of a plurality of checkpoints corresponding to a plurality of processes of the parallel program. Each of the plurality of checkpoint files has a name, which includes a version number. The method further includes taking a plurality of checkpoints using the plurality of checkpoint files.

In yet a further aspect of the present invention, a system of identifying a complete and consistent set of checkpoint files for a parallel program is provided. The system includes, for instance, means for determining, by a plurality of processes of the parallel program, a plurality of version numbers representative of a plurality of current valid checkpoint files corresponding to the plurality of processes; and means for selecting from the plurality of version numbers a selected version number representative of a consistent set of checkpoint files for the parallel program.

In another aspect of the present invention, a system of identifying a set of complete and consistent checkpoint files for a parallel program is provided. The system includes, for example, means for selecting, by a plurality of processes of the parallel program, a plurality of current valid checkpoint files corresponding to the plurality of processes; and means for using the selected plurality of current valid checkpoint files to identify a consistent set of checkpoint files for the parallel program.

In yet another aspect of the present invention, a system of identifying a complete and consistent set of checkpoint files for a parallel program is provided. The system includes, for instance, at least one computing unit adapted to determine, by a plurality of processes of the parallel program, a plurality of version numbers representative of a plurality of current valid checkpoint files corresponding to the plurality of processes. At least one computing unit is adapted to select from the plurality of version numbers a selected version number representative of a consistent set of checkpoint files for the parallel program.

In a further aspect of the present invention, a system of capturing a set of checkpoint files for a parallel program is provided. The system includes, for instance, means for providing a plurality of checkpoint files to be used during a taking of a plurality of checkpoints corresponding to a plurality of processes of the parallel program, wherein each of the plurality of checkpoint files has a name, which includes a version number; and means for taking the plurality of checkpoints using the plurality of checkpoint files.

In another aspect of the present invention, an article of manufacture, including at least one computer usable medium having computer readable program code means embodied therein for causing the identifying of a complete and consistent set of checkpoint files for a parallel program, is provided. The computer readable program code means in the article of manufacture includes, for example, computer readable program code means for causing a computer to determine, by a plurality of processes of the parallel program, a plurality of version numbers representative of a plurality of current valid checkpoint files corresponding to the plurality of processes; and computer readable program code means for causing a computer to select from the plurality of version numbers a selected version number representative of a consistent set of checkpoint files for the parallel program.

In a further aspect of the present invention, at least one program storage device readable by a machine, tangibly embodying at least one program of instructions executable by the machine to perform a method of identifying a set of complete and consistent checkpoint files for a parallel program, is provided. The method includes, for example, selecting, by a plurality of processes of the parallel program, a plurality of current valid checkpoint files corresponding to the plurality of processes; and using the selected plurality of current valid checkpoint files to identify a consistent set of checkpoint files for the parallel program.

In yet another aspect of the present invention, an article of manufacture, including at least one computer usable medium having computer readable program code means embodied therein for causing the capturing of a set of checkpoint files for a parallel program, is provided. The computer readable program code means in the article of manufacture includes, for instance, computer readable program code means for causing a computer to provide a plurality of checkpoint files to be used during a taking of a plurality of checkpoints corresponding to a plurality of processes of the parallel program, wherein each of the plurality of checkpoint files has a name, which includes a version number; and computer readable program code means for causing a computer take the plurality of checkpoints using the plurality of checkpoint files.

The capabilities of the present invention advantageously provide a complete and consistent set of checkpoint files to be used when restarting a parallel program. The techniques of the present invention advantageously provide this consistent set of checkpoint files without requiring the renaming of the checkpoint files. Further, consistency of the checkpoint files does not depend on what an independent machine thinks is the most valid and up-to-date checkpoint data. Instead, synchronization is performed in which the processes themselves are coordinated to determine the set of complete and consistent checkpoint files. Additionally, upon restart, another coordinating operation is performed to ensure that each of the processes has the identified valid checkpoint file.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 5 depicts one example of a typical checkpoint file life cycle, in accordance with the principles of the present invention;

FIG. 8 depicts one example of a partial checkpoint file for a process;

BEST MODE FOR CARRYING OUT THE INVENTION

In accordance with the principles of the present invention, a set of complete and consistent checkpoint files, usable in restarting a parallel program, is captured and identified. Each process of the parallel program participating in checkpoint/restart takes its own checkpoint. The checkpoint data is saved in a checkpoint file, which corresponds to the process taking the checkpoint. In one example, the checkpoint file is named, as follows: Base_Name.Taskid.Version#.

When a parallel program is to be restarted, each of the processes of the parallel program participating in the restart determines the latest valid version of its checkpoint file(s). This information is passed to a coordinator that determines which version of the checkpoint files is consistent and valid for all of the processes. This version is then selected to be used during the restart.

Figure 1A:
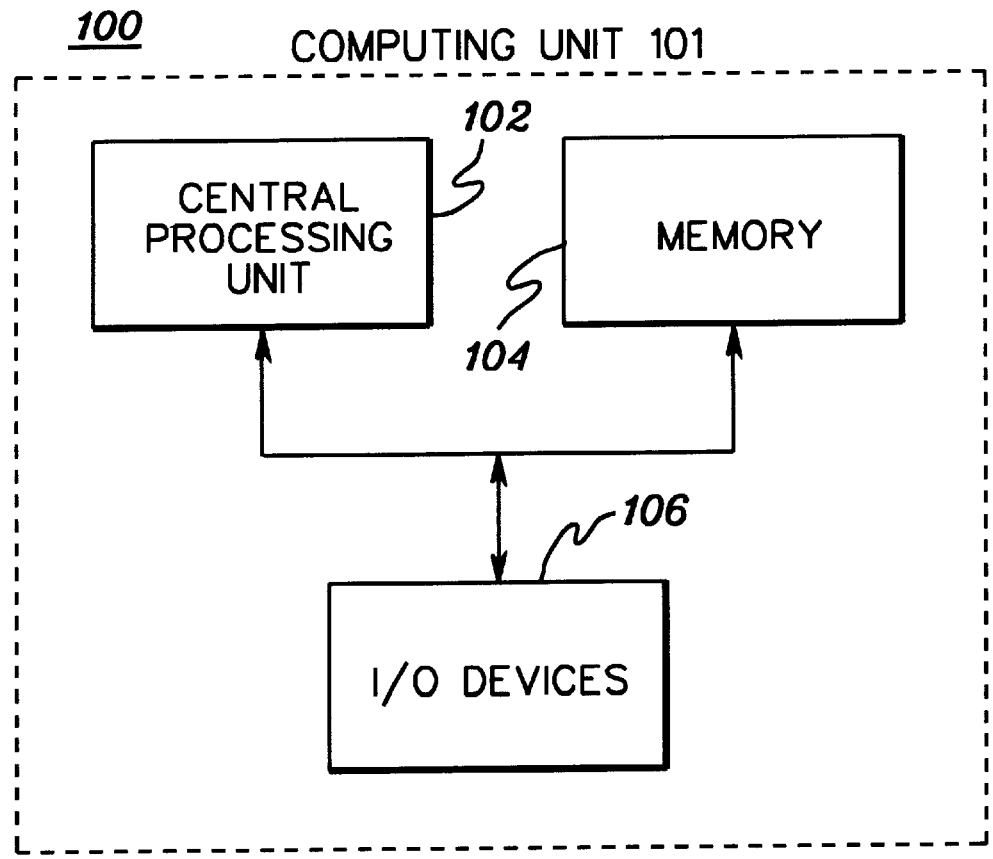
FIGS. 1a and 1b depict examples of computing environments incorporating and using the capabilities of the present invention.

One example of a computing environment incorporating and using the capabilities of the present invention is depicted in FIG. 1a. Computing environment 100 includes, for instance, a computing unit 101 having at least one central processing unit 102, a main memory 104 and one or more input/output devices 106, each of which is described below.

As is known, central processing unit 102 is the controlling center of computing unit 101 and provides the sequencing and processing facilities for instruction execution, interruption action, timing functions, initial program loading and other machine related functions.

The central processing unit executes at least one operating system, which as known, is used to control the operation of the computing unit by controlling the execution of other programs, controlling communication with peripheral devices and controlling use of the computer resources.

Central processing unit 102 is coupled to main memory 104, which is directly addressable and provides for high speed processing of data by the central processing unit. Main memory 104 may be either physically integrated with the CPU or constructed in standalone units.

Main memory 104 and central processing unit 102 are also coupled to one or more input/output devices 106. These devices include, for instance, keyboards, communications controllers, teleprocessing devices, printers, magnetic storage media (e.g., tape, disks), direct access storage devices, sensor-based equipment, and other storage media. Data is transferred from main memory 104 to input/output devices 106, and from the input/output devices back to main memory.

In one example, computing environment 100 is a single system environment, which includes an RS/6000 computer system running an AIX operating system. (RS/6000 and AIX are offered by International Business Machines Corporation). In another example, computing environment 100 includes a UNIX workstation running a UNIX-based operating system. Other variations are also possible and are considered a part of the claimed invention.

Figure 1B:
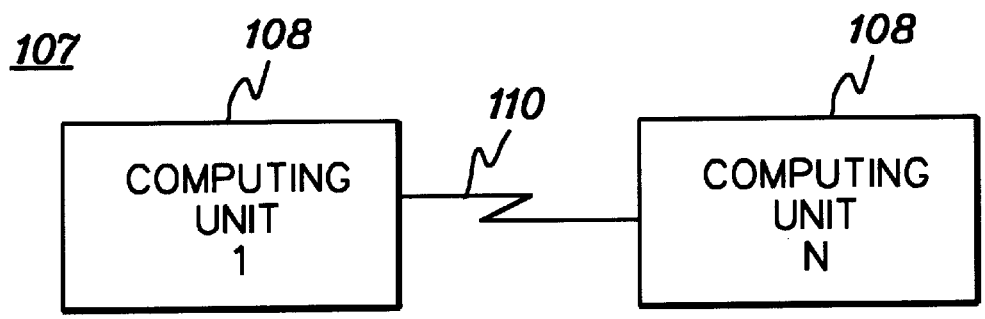

Another embodiment of a computing environment incorporating and using the restore capabilities of the present invention is depicted in FIG. 1b. In one example, a computing environment 107 includes a plurality of computing units 108 coupled to one another via a connection 110. In one example, each unit is an RS/6000 computing node running AIX, and the units are coupled together via a token ring or a local area network (LAN). Each unit includes, for example, a central processing unit, memory and one or more input/output devices.

In another embodiment, each unit is a UNIX workstation running a UNIX-based operating system, and the units are coupled to one another via a TCP/IP connection.

In yet a further embodiment, the environment includes a large parallel system with a plurality of units (e.g., 512 nodes) coupled to one another via a network connection, such as a switch. The invention is not limited to a particular number of units coupled together.

The above embodiments are only examples, however. The capabilities of the present invention can be incorporated and used with any type of computing environments or computing units (e.g., nodes, computers, processors, systems, machines, and/or workstations), without departing from the spirit of the present invention.

A computing unit of the present invention is capable of executing both serial and parallel programs. However, it is in the context of the parallel programs that the capabilities of the present invention are described. A parallel program includes one or more processes (or tasks) that are executed independently. In one example, the processes of a parallel program are coordinated by a coordinating process, and they communicate with each other and with the coordinating process by, for instance, passing messages back and forth. In one example, a Message Passing Interface (MPI), offered by International Business Machines Corporation, is used to communicate between the various processes. MPI is described in "IBM Parallel Environment For AIX: MPI Programming and Subroutine Reference, Version 2, Release 3, IBM Publication No. GC23-3894-02, August 1997, which is hereby incorporated herein by reference in its entirety.

Figure 2:
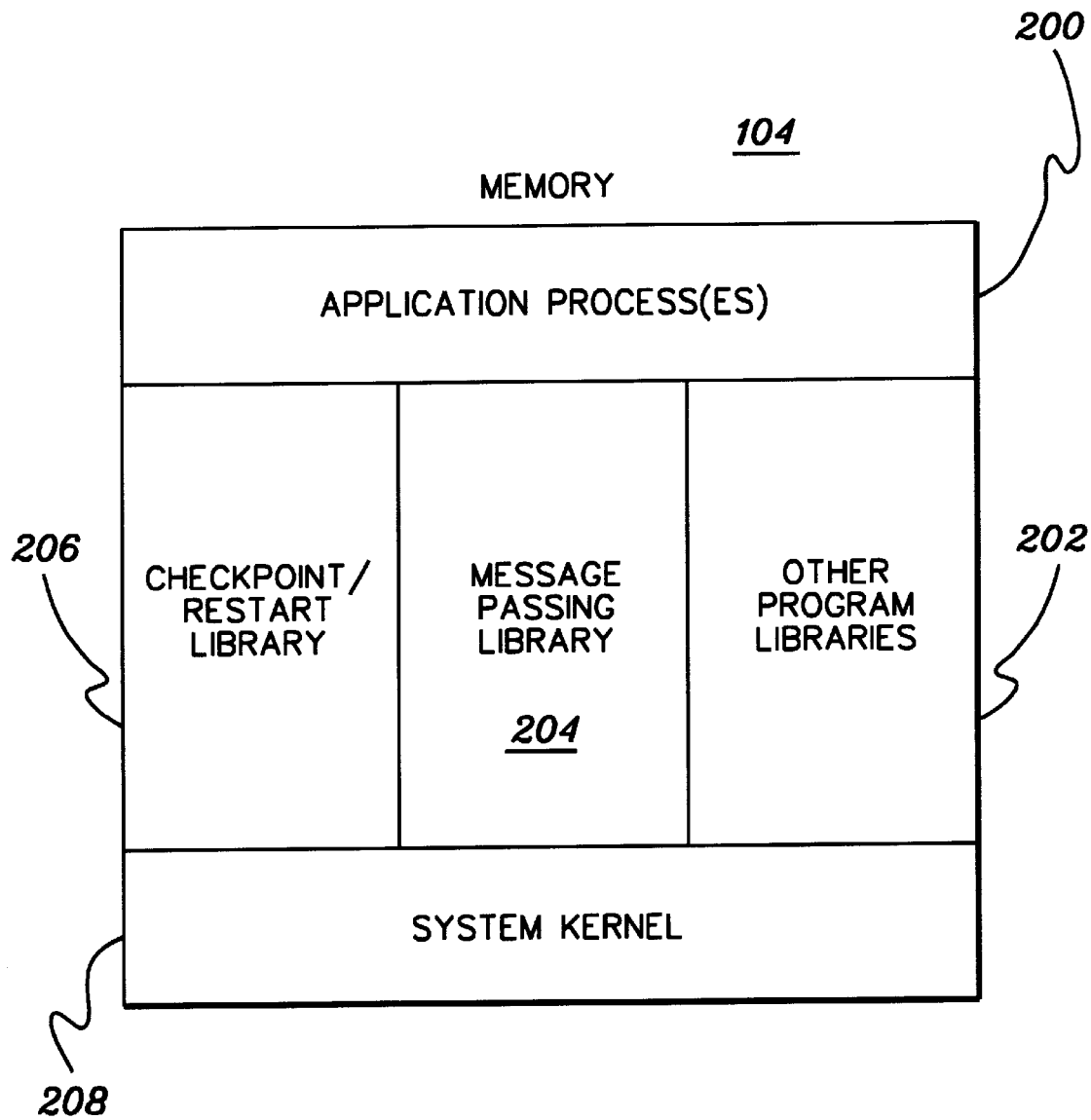
FIG. 2 depicts one example of various components of the memory depicted in FIG. 1a, in accordance with the principles of the present invention.

Each process of a parallel program is loaded in the memory of the computing unit that is to execute the process. This is depicted in FIG. 2. As one example, memory 104 includes one or more application processes 200. Each process makes library calls to various program libraries 202, also loaded within the memory. One program library that is called is a message passing library 204 used by the processes to communicate with one another and with the coordinating process. Another program library that is called, in accordance with the principles of the present invention, is a checkpoint/restart library 206. Checkpoint/restart library 206 is called by each process that wishes to use the checkpoint/restart capabilities of the present invention. In addition to the above, memory 104 includes a system kernel 208, which provides various system services to the application processes and the libraries.

Figure 3:
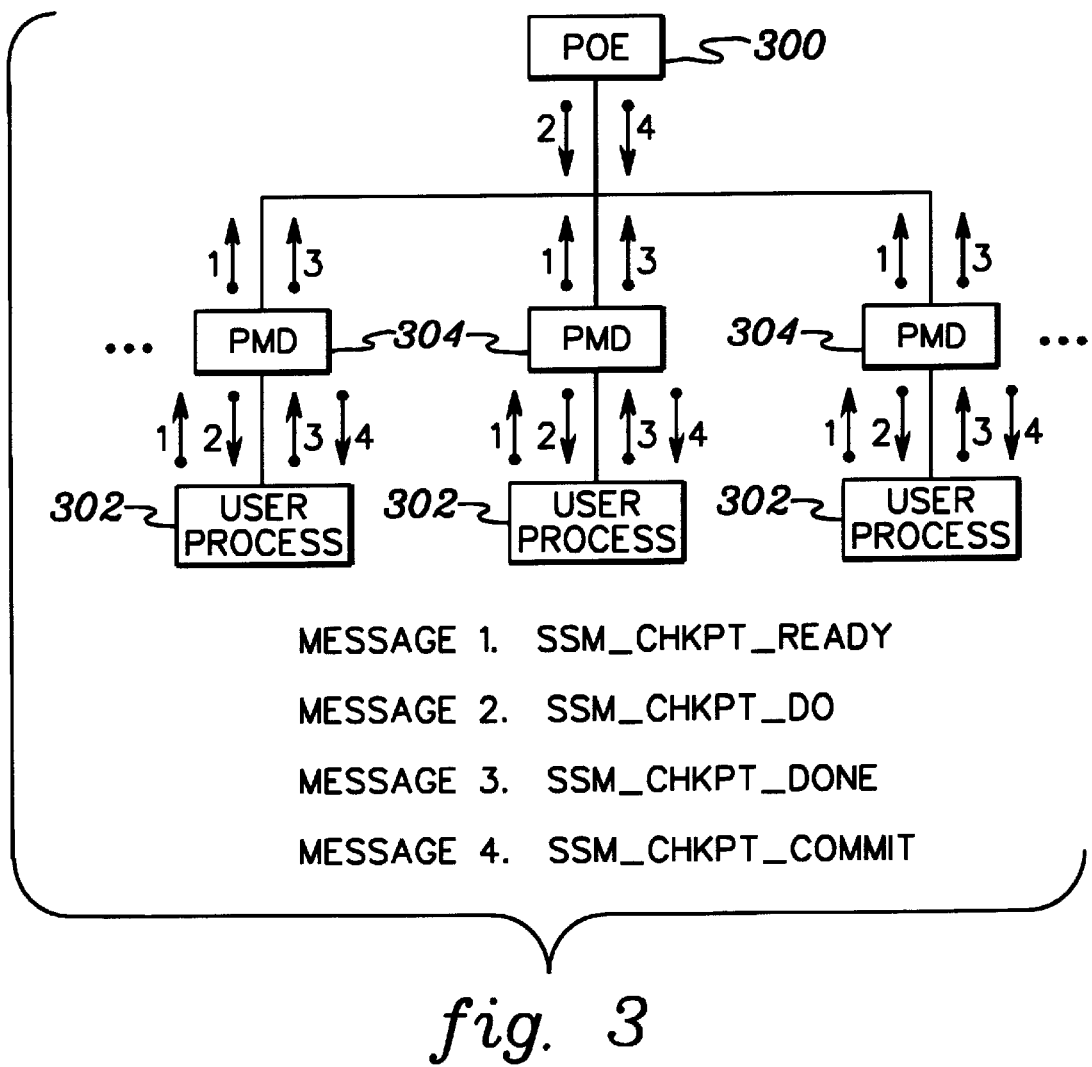
FIG. 3 depicts one example of message communication between a coordinating process and user processes, in accordance with the principles of the present invention.

Each individual process of the parallel program (that is participating in checkpoint/restart) is responsible for taking its own checkpoint and for restarting itself in the event of a failure. However, the timing of when the individual checkpoints are to be taken by the user processes is the responsibility of a coordinating or master process. Communication between the user processes and the coordinating process is illustrated in FIG. 3.

A coordinating process 300 receives messages initiated by user processes 302. In one example, coordinating process 300 is the Parallel Operating Environment (POE) offered by International Business Machines Corporation. The user processes send the messages to POE via, for instance, a partition manager daemon (PMD) 304, which is also offered by International Business Corporation as part of the POE. The PMDs are also used by coordinating process 300 to send messages to the user processes. The POE and PMD are described in detail in "IBM Parallel Environment For AIX: Operation and Use", Vols. 1 and 2, IBM Publication Nos. SC28-1979-01 (August 1997) and SC28-1980-01 (August 1997), which are hereby incorporated herein by reference in their entirety.

In particular, each user process sends a Checkpoint Ready message (message 1), when it is ready to take a checkpoint, and a Checkpoint Done message (message 3), when it has completed taking the checkpoint. Likewise, the coordinating process sends a Checkpoint Do message (message 2), when it is time for the processes to take a checkpoint, and a Checkpoint Commit message (message 4), when the user processes are to commit to the new checkpoint. The use of these messages is further described below, with reference to FIG. 4.

Figure 4:
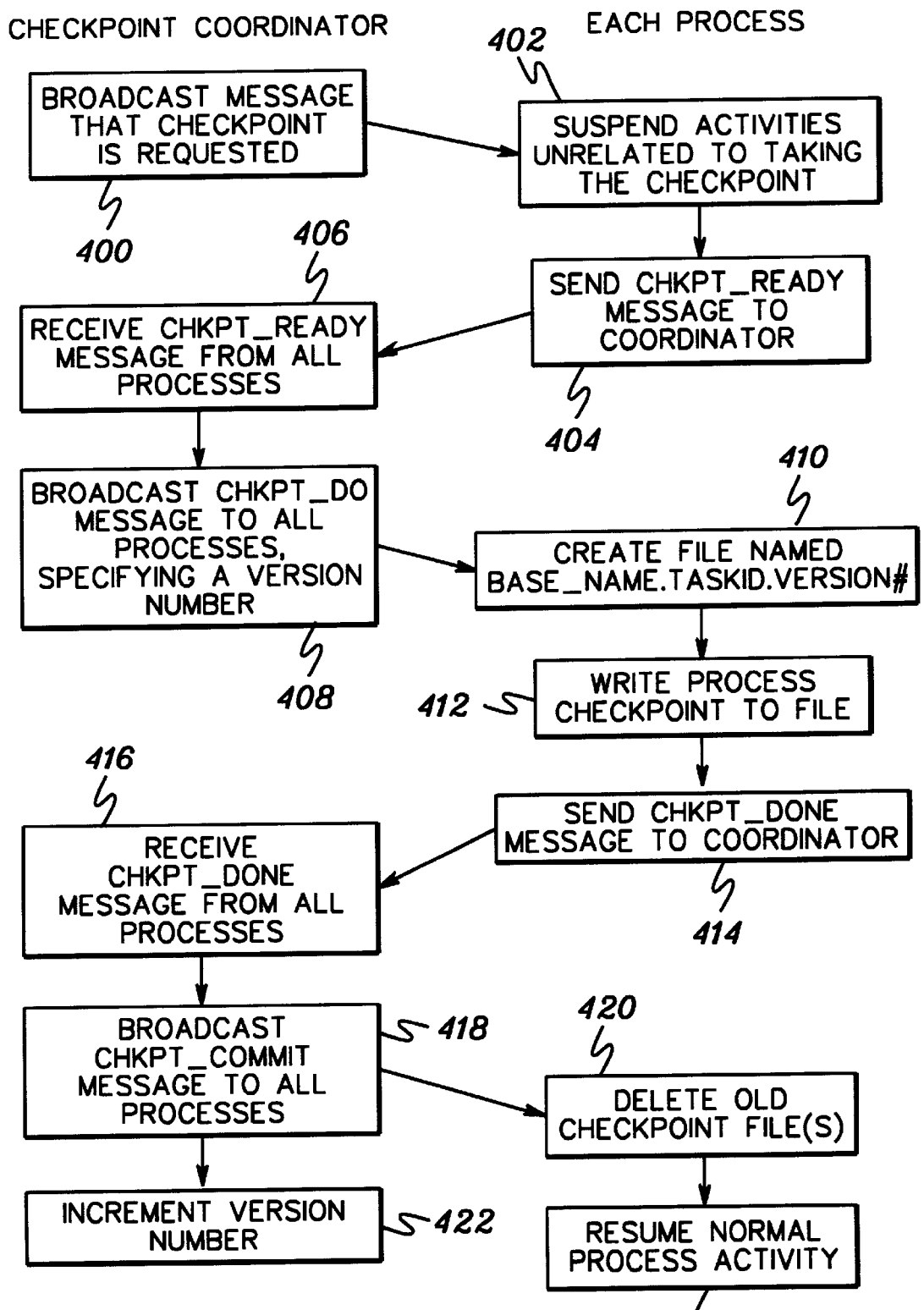
FIG. 4 depicts one embodiment of the sequence of operations performed in order to take a checkpoint of a parallel process, in accordance with the principles of the present invention.

FIG. 4 describes one embodiment of the sequence of operations used by a user process to take a checkpoint. It is possible that numerous processes in a parallel program are taking checkpoints in parallel. The various processes may be running on different computing units of the parallel environment. Each process performs the operations listed in the column "Each Process" in parallel (independently and at the same time), while each of the items in the column "Checkpoint Coordinator" is performed by the coordinating process. The coordinating process may send a message to a particular process or to all of the processes. In the embodiment described herein, each of the messages that originate in the coordinating process are sent to all of the processes participating in the checkpoint process.

Referring to FIG. 4, in one embodiment, the coordinating process broadcasts a message to the processes of the parallel program participating in the checkpoint informing the processes that a checkpoint is requested, STEP 400. As each process receives the message from the coordinating process, it suspends all activities unrelated to taking the checkpoint, STEP 402. Thereafter, each process sends a Checkpoint Ready message to the coordinating process indicating that it is ready to take the checkpoint, STEP 404.

When the coordinating process receives the Checkpoint Ready message from all of the processes that are participating in the checkpoint process, STEP 406, it broadcasts a Checkpoint Do message to all of the participating processes, STEP 408. The Checkpoint Do message informs each user process that it can now take a checkpoint, and it provides to the user process a version number for the checkpoint file.

When the user process receives the Checkpoint Do message, it creates a checkpoint file for storing the checkpoint data, STEP 410. In accordance with the principles of the present invention the checkpoint file is given the following name, in one example: Base_Name.Taskid.Version#. The base file name (Base_Name) is the same for all the checkpoint files of all the processes of a particular parallel program. The task id is a unique id, running from one to the number of processes in the parallel program. The version number, which is appended as a suffix to the checkpoint file name, is incremented by one each time a parallel checkpoint is taken.

After creating the checkpoint file, the user process takes a checkpoint of its process by writing process information to the checkpoint file that was named earlier, STEP 412. The information written to the checkpoint file includes, for instance, in-transit message data, a data section (having, for instance, global variables and a heap), file offsets, signal state, executable information, stack contents and register contents of the process. This is further described in detail in co-pending, commonly assigned, U.S. Patent Application entitled "A Method of Performing Checkpoint/Restart of a Parallel Program," by Meth et al., Ser. No. 09/181,985, which is hereby incorporated herein by reference in its entirety. Other embodiments for taking a checkpoint are described in "Checkpoint and Migration of Unix Processes in the Condor Distributed Processing System", by Todd Tannenbaum, Michael Litzkow, Dr. Dobbs Journal, 227:40–48, Feb. 1995; and in "Checkpoint and Migration of UNIX Processes in the Condor Distributed Processing System", by Michael Litzkow, Todd Tannenbaum, Jim Basney, and Miron Livny, University of Wisconsin-Madison Computer Science Technical Report #1346, April 1977, each of which is also hereby incorporated herein by reference in its entirety.

When the process is finished taking its checkpoint, it sends a Checkpoint Done message to the coordinating process indicating that it has completed taking its checkpoint, STEP 414. After the coordinating process receives a Checkpoint Done message from all of the participating processes, STEP 416, it broadcasts a Checkpoint Commit message to all of the participating processes, STEP 418. When a process receives the Checkpoint Commit message, it may safely delete any old copies of its checkpoint file, STEP 420. By the time the Checkpoint Commit message arrives, all of the participating processes have completed writing to their new checkpoint files. Thereafter, the process resumes its normal activities, STEP 421.

In addition to the above, after the coordinating process broadcasts the Checkpoint Commit message, it increments the version number, STEP 422. This completes the sequence of operations used to take a checkpoint.

One example of the order in which checkpoint files are created and deleted for a parallel program having two processes is described with reference to FIG. 5. (Although two processes are described with reference to the figures, any number of processes may be involved.) As previously mentioned, each checkpoint file has a checkpoint file name 500, which includes three components: a base name 502, which is CHKPT in the examples herein, a task id 504, and a version number 506. Thus, the checkpoint file named "CHKPT.1.1" represents the first version of the checkpoint file for Process 1.

Initially, there are no checkpoint files (510) for Process 1 and Process 2, since no checkpoints have been taken. Then, Process 1 and Process 2 each takes a checkpoint (512), producing CHKPT.1.1 and CHKPT.2.1, respectively. Subsequently, a second checkpoint is taken, but no commit has been performed, as of yet (514). Thus, each process has two checkpoint files. Thereafter, a commit is performed (516) and the older checkpoint file for each process is deleted. Next, a third checkpoint is taken (518), and subsequently, another commit (520).

A complete and consistent set of checkpoint files includes one valid checkpoint file per process, where each such checkpoint file has the same version number. For example, entry 516 of FIG. 5 indicates that a complete and consistent set of checkpoint files for the parallel program of this example includes CHKPT.1.2 and CHKPT.2.2. Each file of the set has the same version number, i.e., version number 2.

When message passing is part of the checkpoint process, certain failures may occur which affect the checkpoint files. For example, if a failure occurs while messages are being sent between the various computing units of a parallel computing environment, those messages may be lost and thus, affect the checkpoint files.

Figure 6:
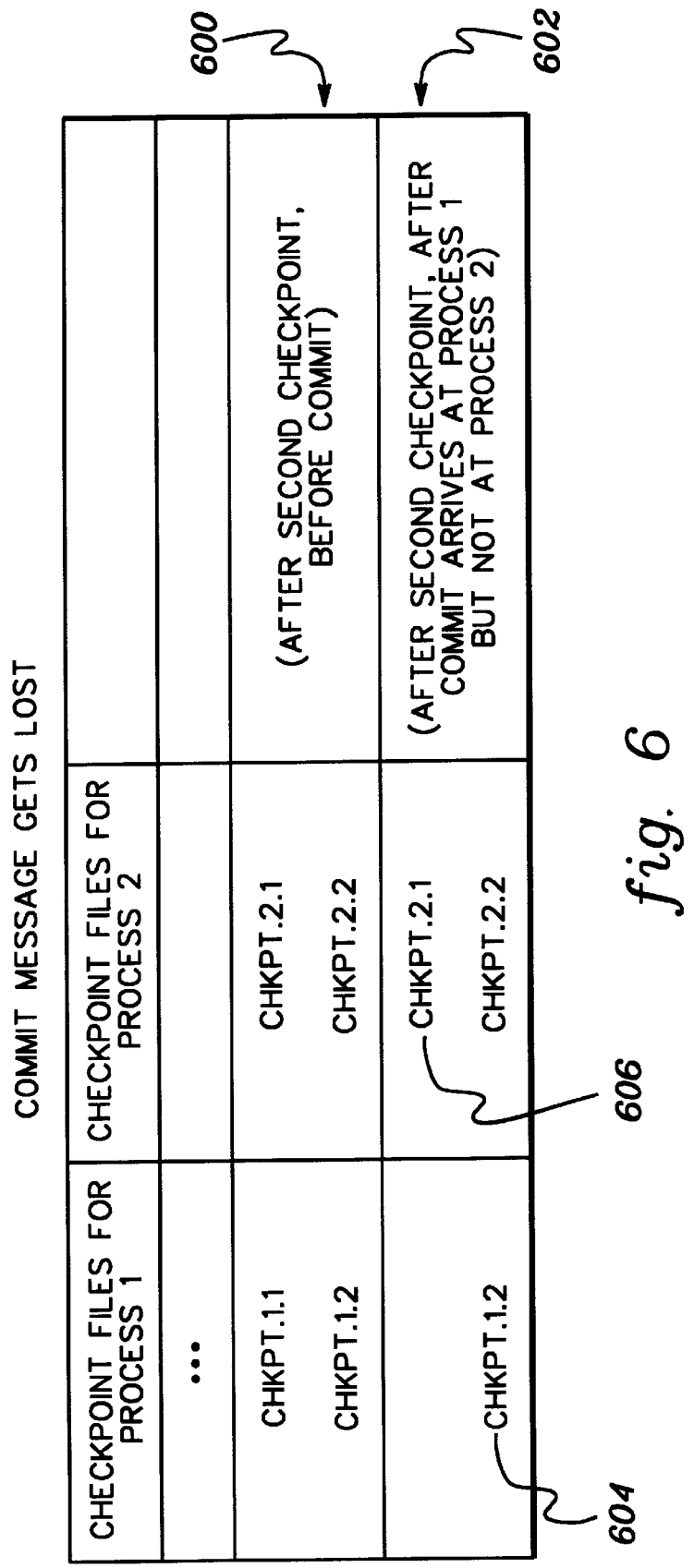
FIG. 6 depicts one example of a commit message getting lost.

As an example, assume that a failure occurs just as the coordinating process is sending the Checkpoint Commit message to the user processes. Further, assume that the message arrives at some of the processes but not at others. This results in a condition, which is depicted in FIG. 6. In FIG. 6, a checkpoint is taken by Process 1 and Process 2 (600). However, the Commit message arrived at Process 1, but not at Process 2 (602). Since Process 1 received the commit message, it deleted the old version of its checkpoint file, CHKPT.1.1. Thus, the only valid checkpoint file it has left is CHKPT.1.2 (604). On the other hand, Process 2 did not receive the Commit message, and hence it did not delete its old checkpoint file (606). Therefore, Process 2 has two valid checkpoint files: CHKPT.2.1 and CHKPT.2.2. This situation is taken into consideration during restart (described below), in accordance with the principles of the present invention.

A further example is described with reference to FIG. 7. A checkpoint is taken by Process 1 (e.g., CHKPT.1.1) and by Process 2 (e.g., CHKPT.2.1) (700). However, Process 1 fails to write a second checkpoint file, while Process 2 succeeds (702). This condition can occur (among other reasons) in the case in which the Checkpoint Do message never reaches Process 1, or if Process 1 fails before it has a chance to write the new checkpoint file, or if there is insufficient disk space available for Process 1 to create a new checkpoint file.

In the above scenario there is an old valid checkpoint file for Process 1, namely CHKPT.1.1; and there are two valid checkpoint files for Process 2, namely CHKPT.2.1 and CHKPT.2.2. Again, this situation is taken into consideration in the present invention during restart, as explained below.

A yet further example is described with reference to FIG. 8. A checkpoint is taken by Process 1 (e.g., CHKPT1.1) and by Process 2 (e.g., CHKPT.2.1) (800). Thereafter, Process 1 begins taking a second checkpoint, but does not successfully complete that checkpoint. Since Process 1 did not successfully complete its checkpoint, the coordinating process never sent out the Commit message. Therefore, the old checkpoint files were not deleted (802). This results in two valid versions of the checkpoint file for Process 2: CHKPT.2.1 and CHKPT.2.2; and one valid checkpoint file (CHKPT1.1) and one invalid checkpoint file (CHKPT.1.2) for Process 1. Once again, this situation is addressed during restart, in accordance with the principles of the present invention.

Figure 9:
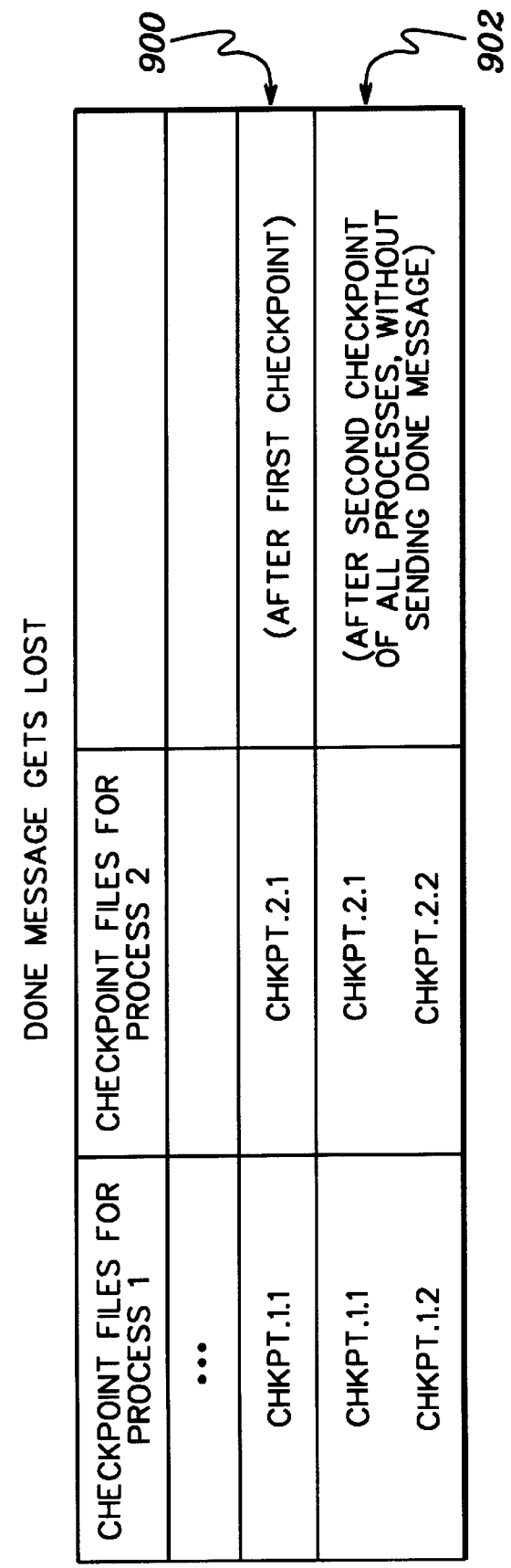
FIG. 9 depicts one example of a Checkpoint Done message getting lost for a process.

Another example is described with reference to FIG. 9. A first checkpoint is taken by Process 1 (e.g., CHKPT.1.1) and by Process 2 (e.g., CHKPT.2.1) (900). Thereafter, Process 1 and Process 2 take a second checkpoint (e.g. CHKPT.1.2 and CHKPT.2.2, respectively) (902). However, in this scenario, one of the Checkpoint Done messages fails to make it to the coordinating process. This can occur if there is a failure at the instance at which the Done message is sent by the process. If that occurs, the coordinating process does not know that the checkpoint completed successfully, and therefore, the coordinating process thinks that the most recent valid checkpoint is the old checkpoint rather than the new checkpoint. In this example, there are two valid versions of the checkpoint file for Process 1, CHKPT.1.1 and CHKPT.1.2, and two valid versions for Process 2, CHKPT.2.1 and CHKPT.2.2. This situation is addressed during restart, in accordance with the principles of the present invention.

Figure 10:
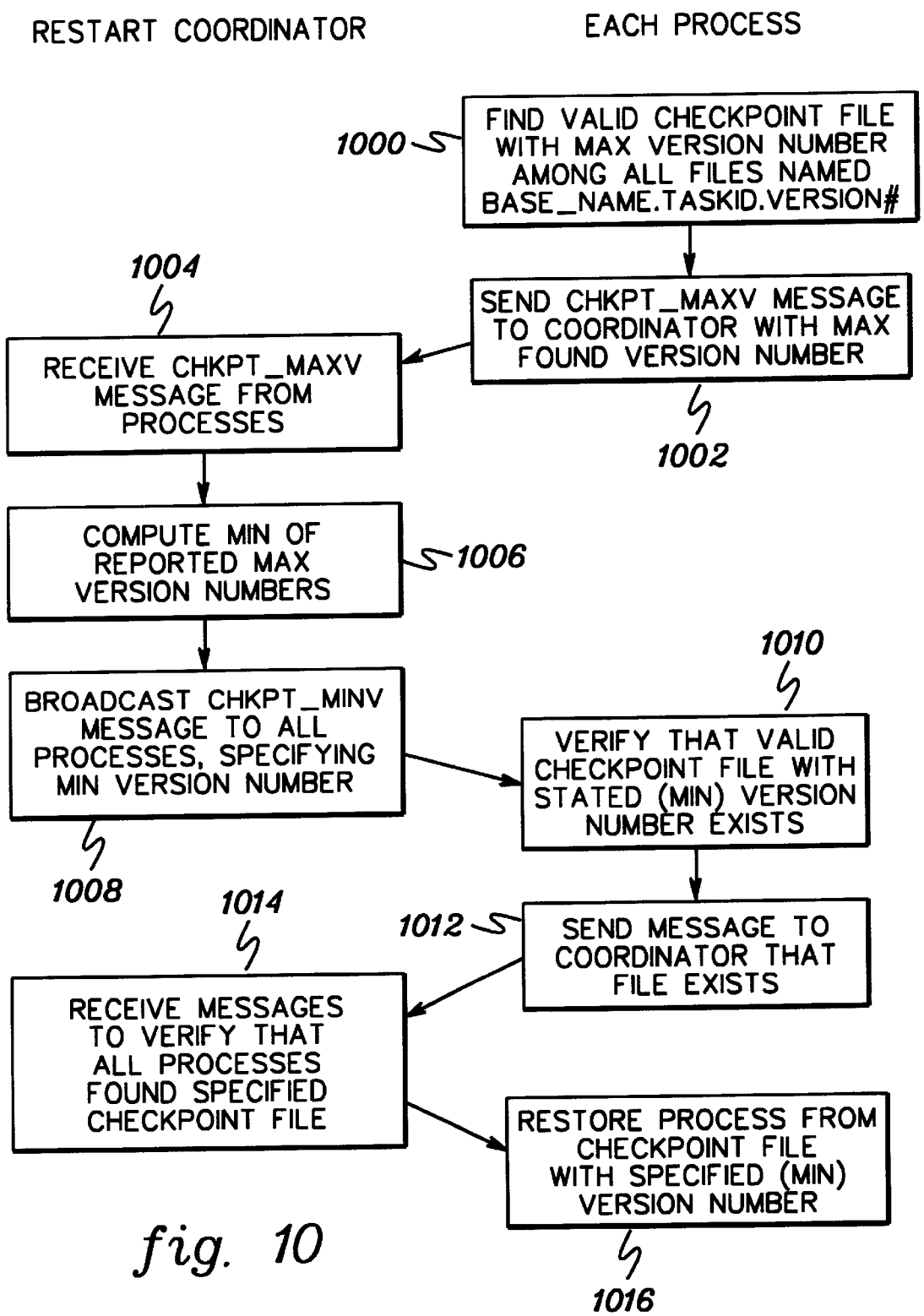
FIG. 10 depicts one embodiment of the sequence of operations used to determine a complete and consistent set of checkpoint files, in accordance with the principles of the present invention.

The checkpoint files created by the processes are used to restart the processes should the processes need to be restarted. One embodiment of the sequence of operations used to restart each process is described with reference to FIG. 10. In particular, FIG. 10 depicts the order of operations used to determine a complete and consistent set of checkpoint files for a parallel program.

During the restart sequence, each participating process in the restart determines which files are checkpoint files for that process. This is accomplished by parsing the names of the files of the form Base_Name.Taskid.Version#. That is, the process looks for those files with the correct checkpoint file base name that have a matching task id component. The process may find more than one such checkpoint file. Thus, the process tests the checkpoint files for validity.

In one embodiment, the validity checking is accomplished by checking the well defined structure of the checkpoint file. In particular, there are a number of sections in the checkpoint file (for each of the kinds of data that are saved), and for each section, there is stored in the checkpoint file a length of the section. Thus, from the contents of the checkpoint file, it can be determined whether each of the required sections is present, and further, whether each of the sections is of the proper length. If a process failed before it completed writing to the checkpoint file, then one of the sections will be missing or the length of the section that was not completely written will be inconsistent with the length recorded as the proper length of the section.

Once the process determines its valid checkpoint files, it determines therefrom the largest version number for its various valid checkpoint files, STEP 1000. In particular, the process determines which version of its checkpoint files is valid and most current.

The process then informs the coordinating process of this maximum valid checkpoint file version number, STEP 1002.

The coordinating process receives one such maximum version number from each participating process, STEP 1004. It then chooses the smallest of these numbers, STEP 1006. This smallest version number represents a version that at sometime had been valid for all of the processes. The coordinating process then informs all of the participating processes of this common version number, STEP 1008.

Each participating process then verifies that a valid checkpoint file with the specified version number exists for that process, STEP 1010. In one example, this is accomplished by checking that a checkpoint file with the proper task id and version number exists, and by further checking that it is valid. After it verifies that such a checkpoint file exists, it sends a message to the coordinating process indicating that it has a valid checkpoint file with the specified version number, STEP 1012.

When all of the participating processes have sent messages to the coordinating process verifying that such a valid checkpoint file exists (all with the same version number), a complete and consistent set of checkpoint files has been identified, STEP 1014. Thus, the coordinating process informs the participating processes that they can restore themselves using the identified checkpoint files.

Each process then restores itself from its designated checkpoint file, STEP 1016. In particular, each process copies data from its corresponding checkpoint file, designated by the version number, to memory of the computing unit executing the process. Further details associated with restarting a process is described in detail in co-pending, commonly assigned, U.S. Patent Application entitled "A METHOD OF PERFORMING CHECKPOINT/RESTART OF A PARALLEL PROGRAM," by Meth, et al., Ser. No. 09/181,985, (Docket No. P09-98-108), which has been incorporated herein by reference in its entirety.

The techniques of the present invention provide for the capturing and identifying of a complete and consistent set of checkpoint files for a parallel program, even when messages are lost or failures occur. This is described above and further illustrated in the examples detailed below.

Returning to the example of FIG. 6, the Commit message arrives at Process 1, but not at Process 2. Thus, there are two valid checkpoint files for Process 2, but only one for Process 1. In accordance with the principles of the present invention, checkpoint files that are consistent with one another are chosen for Process 1 and Process 2. In particular, both Process 1 and Process 2 compute the maximum version number of the valid checkpoint files, and both come up with version 2. Since Process 1 and Process 2 agree on the same version number, that version represents the complete and consistent set of checkpoint files.

In the above example, note that the Commit message is not sent until all of the participating processes have informed the coordinating process that they have completed writing their checkpoint files. At this point, even if the Commit message never arrives, there is already a new set of complete and consistent checkpoint files. Thus, even if an old checkpoint file is not erased, the new set is already complete. It is the capabilities of the present invention that find this new complete set of checkpoint files.

Figure 7:
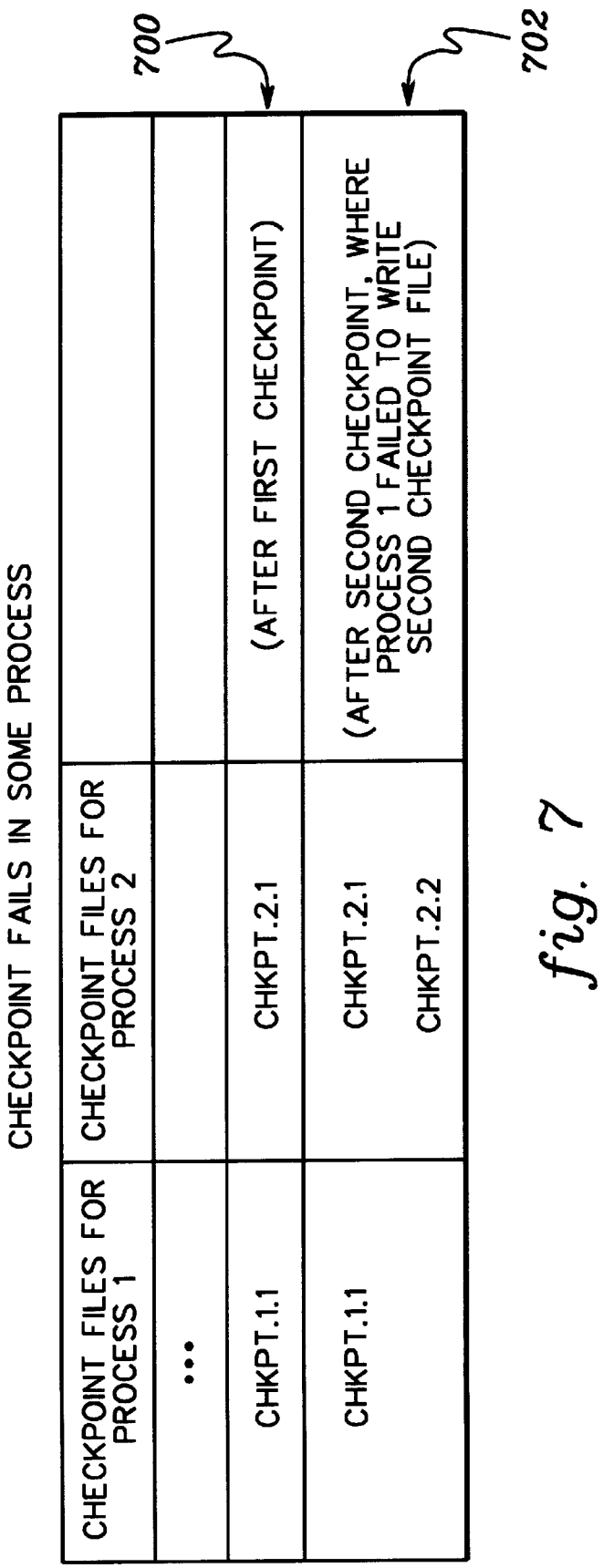
FIG. 7 depicts one embodiment in which a checkpoint failed for a process.

As a further example, refer to FIG. 7. In FIG. 7, Process 1 fails to write a second checkpoint, but Process 2 is successful in its second checkpoint. In accordance with the principles of the present invention, upon restart, each process computes its maximum checkpoint file version number. Process 1 reports that its maximum version is 1 and Process 2 reports that its maximum version is 2. The coordinating process takes the minimum of these version numbers, (in this case, 1), and informs all of the processes to use version 1. This version still exists for Process 2, because Process 2 never received the Commit message informing it to delete the old checkpoint file. That is, the coordinating process did not send the Commit message to Process 2, since Process 1 did not successfully complete its version 2 of the checkpoint.

Another example is described with reference to FIG. 8. FIG. 8 depicts the situation in which Process 1 writes a partial second checkpoint, and Process 2 writes a complete second checkpoint. Again, in order to determine a consistent set of checkpoint files, each process, upon restart, searches for the maximum version number among its valid checkpoint files. Process 1 finds the checkpoint files with versions 1 and 2, but it detects that version 2 is invalid. Therefore, Process 1 reports that its maximum valid version number is 1. Process 2 reports that its maximum version number is 2. Thus, the coordinating process chooses the smaller of these version numbers (e.g., version 1) and instructs all of the processes to restart from version 1.

A further example is described with reference to FIG. 9. FIG. 9 depicts the situation in which Process 1 and Process 2 both write a successful second checkpoint; however, the coordinating process never receives a Done message from at least one of the processes. In order to determine a consistent set of checkpoint files, each process upon restart, searches for the maximum version among its valid checkpoint files. In this case, both Process 1 and Process 2 detect that they have two checkpoint files which are valid, and therefore, they both report that their maximum valid version number is 2. Thus, the coordinating process chooses version number 2 and instructs all other processes to restart from version 2.

Described in detail above are capabilities for capturing and identifying a complete and consistent set of checkpoint files to be used to restart a parallel program. Before any of the processes takes a checkpoint, synchronization is performed in order to ensure that a valid state of the parallel program is captured. All of the processes then take a checkpoint, writing a new checkpoint file with a new version number. When all of the processes have completed writing their checkpoint files, they perform another synchronization. A result of this synchronization is the informing of all of the processes that they may now safely destroy the old versions of the checkpoint files.

Upon restart, another synchronization is performed to determine a complete and consistent set of checkpoint files to be used to restart the parallel program. This set is determined even though messages are lost or failures occur.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of identifying a complete and consistent set of checkpoint files for a parallel program, said method comprising:

determining, by a plurality of processes of said parallel program, a plurality of version numbers representative of a plurality of current valid checkpoint files corresponding to said plurality of processes; and selecting from said plurality of version numbers a selected version number representative of a consistent set of checkpoint files for said parallel program.

2. The method of claim 1, wherein said consistent set of checkpoint files comprises a plurality of checkpoint files corresponding to said plurality of processes and having said selected version number.

3. The method of claim 2, further comprising restoring said plurality of processes using said plurality of checkpoint files having said selected version number.

4. The method of claim 3, further comprising verifying, by said plurality of processes, prior to restoring, that said plurality of processes have said plurality of checkpoint files with said selected version number.

5. The method of claim 4, wherein said selecting is performed by a coordinating process, and wherein said method further comprises said coordinating process informing said plurality of processes, prior to verifying, of said selected version number.

6. The method of claim 1, wherein each of said plurality of current valid checkpoint files has a corresponding name, and wherein each corresponding name includes one of said plurality of version numbers.

7. The method of claim 1, wherein said determining, for each process of said plurality of processes, comprises:
   identifying one or more valid checkpoint files corresponding to said each process, wherein each of said one or more valid checkpoint files has a corresponding name with a version number; and
   selecting from said one or more valid checkpoint files a maximum version number, wherein said plurality of version numbers comprises a plurality of maximum version numbers.

8. The method of claim 7, wherein said selected version number is a minimum version number selected from said plurality of maximum version numbers.

9. A method of identifying a set of complete and consistent checkpoint files for a parallel program, said method comprising:
   selecting, by a plurality of processes of said parallel program, a plurality of current valid checkpoint files corresponding to said plurality of processes; and
   using said selected plurality of current valid checkpoint files to identify a consistent set of checkpoint files for said parallel program.

10. A method of capturing a set of checkpoint files for a parallel program, said method comprising:
    providing a plurality of checkpoint files to be used during a taking of a plurality of checkpoints corresponding to a plurality of processes of said parallel program, wherein each of said plurality of checkpoint files has a name, which includes a version number; and
    taking said plurality of checkpoints using said plurality of checkpoint files.

11. The method of claim 10, further comprising synchronizing said taking of said plurality of checkpoints.

12. The method of claim 10, further comprising synchronizing deletion of any older versions of said plurality of checkpoint files.

13. The method of claim 10, further comprising restoring said plurality of processes using a consistent set of checkpoint files, wherein each checkpoint file of said consistent set has a same version number.

14. A system of identifying a complete and consistent set of checkpoint files for a parallel program, said system comprising:
    means for determining, by a plurality of processes of said parallel program, a plurality of version numbers representative of a plurality of current valid checkpoint files corresponding to said plurality of processes; and
    means for selecting from said plurality of version numbers a selected version number representative of a consistent set of checkpoint files for said parallel program.

15. The system of claim 14, wherein said consistent set of checkpoint files comprises a plurality of checkpoint files corresponding to said plurality of processes and having said selected version number.

16. The system of claim 15, further comprising means for restoring said plurality of processes using said plurality of checkpoint files having said selected version number.

17. The system of claim 16, further comprising means for verifying, by said plurality of processes, prior to restoring, that said plurality of processes have said plurality of checkpoint files with said selected version number.

18. The system of claim 17, wherein said means for selecting uses a coordinating process, and wherein said system further comprises means for informing, by said coordinating process, said plurality of processes of said selected version number.

19. The system of claim 14, wherein each of said plurality of current valid checkpoint files has a corresponding name, and wherein each corresponding name includes one of said plurality of version numbers.

20. The system of claim 14, wherein said means for determining, for each process of said plurality of processes, comprises:
    means for identifying one or more valid checkpoint files corresponding to said each process, wherein each of said one or more valid checkpoint files has a corresponding name with a version number; and
    means for selecting from said one or more valid checkpoint files a maximum version number, wherein said plurality of version numbers comprises a plurality of maximum version numbers.

21. The system of claim 20, wherein said selected version number is a minimum version number selected from said plurality of maximum version numbers.

22. A system of identifying a set of complete and consistent checkpoint files for a parallel program, said system comprising:
    means for selecting, by a plurality of processes of said parallel program, a plurality of current valid checkpoint files corresponding to said plurality of processes; and
    means for using said selected plurality of current valid checkpoint files to identify a consistent set of checkpoint files for said parallel program.

23. A system of identifying a complete and consistent set of checkpoint files for a parallel program, said system comprising:
    at least one computing unit adapted to determine, by a plurality of processes of said parallel program, a plurality of version numbers representative of a plurality of current valid checkpoint files corresponding to said plurality of processes; and
    at least one computing unit adapted to select from said plurality of version numbers a selected version number representative of a consistent set of checkpoint files for said parallel program.

24. A system of capturing a set of checkpoint files for a parallel program, said system comprising:
    means for providing a plurality of checkpoint files to be used during a taking of a plurality of checkpoints corresponding to a plurality of processes of said parallel program, wherein each of said plurality of checkpoint files has a name, which includes a version number; and
    means for taking said plurality of checkpoints using said plurality of checkpoint files.

25. The system of claim 24, further comprising means for synchronizing said taking of said plurality of checkpoints.

26. The system of claim 24, further comprising means for synchronizing deletion of any older versions of said plurality of checkpoint files.

27. The system of claim 24, further comprising means for restoring said plurality of processes using a consistent set of checkpoint files, wherein each checkpoint file of said consistent set has a same version number.

28. An article of manufacture, comprising:
- at least one computer usable medium having computer readable program code means embodied therein for causing the identifying of a complete and consistent set of checkpoint files for a parallel program, said computer readable program code means in said article of manufacture comprising:
  - computer readable program code means for causing a computer to determine, by a plurality of processes of said parallel program, a plurality of version numbers representative of a plurality of current valid checkpoint files corresponding to said plurality of processes; and
  - computer readable program code means for causing a computer to select from said plurality of version numbers a selected version number representative of a consistent set of checkpoint files for said parallel program.

29. The article of manufacture of claim 28, wherein said consistent set of checkpoint files comprises a plurality of checkpoint files corresponding to said plurality of processes and having said selected version number.

30. The article of manufacture of claim 29, further comprising computer readable program code means for causing a computer to restore said plurality of processes using said plurality of checkpoint files having said selected version number.

31. The article of manufacture of claim 30, further comprising computer readable program code means for causing a computer to verify, by said plurality of processes, prior to restoring, that said plurality of processes have said plurality of checkpoint files with said selected version number.

32. The article of manufacture of claim 31, wherein said computer readable program code means for causing a computer to select uses a coordinating process, and wherein said article of manufacture further comprises computer readable program code means for causing a computer to inform, by said coordinating process, said plurality of processes, prior to verifying, of said selected version number.

33. The article of manufacture of claim 28, wherein each of said plurality of current valid checkpoint files has a corresponding name, and wherein each corresponding name includes one of said plurality of version numbers.

34. The article of manufacture of claim 28, wherein said computer readable program code means for causing a computer to determine, for each process of said plurality of processes, comprises:
- computer readable program code means for causing a computer to identify one or more valid checkpoint files corresponding to said each process, wherein each of said one or more valid checkpoint files has a corresponding name with a version number; and
- computer readable program code means for causing a computer to select from said one or more valid checkpoint files a maximum version number, wherein said plurality of version numbers comprises a plurality of maximum version numbers.

35. The article of manufacture of claim 34, wherein said selected version number is a minimum version number selected from said plurality of maximum version numbers.

36. At least one program storage device readable by a machine, tangibly embodying at least one program of instructions executable by the machine to perform a method of identifying a set of complete and consistent checkpoint files for a parallel program, said method comprising:
- selecting, by a plurality of processes of said parallel program, a plurality of current valid checkpoint files corresponding to said plurality of processes; and
- using said selected plurality of current valid checkpoint files to identify a consistent set of checkpoint files for said parallel program.

37. An article of manufacture comprising:
- at least one computer usable medium having computer readable program code means embodied therein for causing the capturing of a set of checkpoint files for a parallel program, said computer readable program code means in said article of manufacture comprising:
  - computer readable program code means for causing a computer to provide a plurality of checkpoint files to be used during a taking of a plurality of checkpoints corresponding to a plurality of processes of said parallel program, wherein each of said plurality of checkpoint files has a name, which includes a version number; and
  - computer readable program code means for causing a computer to take said plurality of checkpoints using said plurality of checkpoint files.

38. The article of manufacture of claim 37, further comprising computer readable program code means for causing a computer to synchronize said taking of said plurality of checkpoints.

39. The article of manufacture of claim 37, further comprising computer readable program code means for causing a computer to synchronize deletion of any older versions of said plurality of checkpoint files.

40. The article of manufacture of claim 37, further comprising computer readable program code means for causing a computer to restore said plurality of processes using a consistent set of checkpoint files, wherein each checkpoint file of said consistent set has a same version number.

41. A system of identifying a set of complete and consistent checkpoint files for a parallel program, said system comprising:
- a plurality of processes of said parallel program to select a plurality of current valid checkpoint files corresponding to said plurality of processes; and
- at least one computing unit adapted to use said selected plurality of current valid checkpoint files to identify a consistent set of checkpoint files for said parallel program.

42. A system of capturing a set of checkpoint files for a parallel program, said system comprising:
- a plurality of checkpoint files to be used during a taking of a plurality of checkpoints corresponding to a plurality of processes of said parallel program, wherein each of said plurality of checkpoint files has a name, which includes a version number; and
- at least one computing unit to take said plurality of checkpoints using said plurality of checkpoint files.

\* \* \* \* \*